(12) United States Patent
Poljén et al.

(10) Patent No.: US 7,957,838 B2
(45) Date of Patent: Jun. 7, 2011

(54) CONTROL SYSTEM, METHOD AND COMPUTER PROGRAM

(75) Inventors: Christian Poljén, Enköping (SE); Fredrik Hedenfalk, Västerås (SE)

(73) Assignee: ABB AB, Västerås (SE)

( * ) Notice: Subject to any disclaimer, the term of this patent is extended or adjusted under 35 U.S.C. 154(b) by 1057 days.

(21) Appl. No.: 10/583,091

(22) PCT Filed: Dec. 9, 2004

(86) PCT No.: PCT/SE2004/001830
§ 371 (c)(1),
(2), (4) Date: May 15, 2007

(87) PCT Pub. No.: WO2005/056247
PCT Pub. Date: Jun. 23, 2005

(65) Prior Publication Data
US 2007/0250213 A1    Oct. 25, 2007

(30) Foreign Application Priority Data

Dec. 15, 2003 (SE) .................... 0303384-2

(51) Int. Cl.
*G05B 15/00* (2006.01)
*G05B 19/00* (2006.01)

(52) U.S. Cl. ........ 700/264; 700/245; 700/247; 700/248; 318/568.11; 318/568.13; 318/568.14

(58) Field of Classification Search ............ 700/245, 700/247, 248, 264; 901/2, 3, 4, 8, 49; 318/568.11, 318/568.13, 568.14; 345/156, 161, 168, 345/173

See application file for complete search history.

(56) References Cited

U.S. PATENT DOCUMENTS

| | | | |
|---|---|---|---|
| 5,046,022 A | 9/1991 | Conway et al. | |
| 5,079,491 A * | 1/1992 | Nose et al. | 318/568.11 |
| 5,204,942 A * | 4/1993 | Otera et al. | 700/248 |
| 5,648,897 A * | 7/1997 | Johnson et al. | 700/83 |
| 5,687,295 A | 11/1997 | Kaihori et al. | |
| 5,742,824 A * | 4/1998 | Kosaka | 718/106 |
| 5,784,542 A * | 7/1998 | Ohm et al. | 700/260 |
| 5,862,056 A | 1/1999 | Iwata et al. | |
| 5,880,956 A * | 3/1999 | Graf | 700/86 |
| 6,212,443 B1 * | 4/2001 | Nagata et al. | 700/245 |
| 6,330,493 B1 * | 12/2001 | Takahashi et al. | 700/245 |
| 6,330,495 B1 | 12/2001 | Kaneko et al. | |
| 6,434,448 B1 * | 8/2002 | Kosaka et al. | 700/245 |
| 6,442,451 B1 * | 8/2002 | Lapham | 700/245 |
| 6,466,844 B1 * | 10/2002 | Ikeda et al. | 700/245 |
| 6,496,756 B1 * | 12/2002 | Nishizawa et al. | 700/264 |
| 6,556,891 B2 * | 4/2003 | Hietmann et al. | 700/245 |
| 6,675,070 B2 * | 1/2004 | Lapham | 700/245 |
| 6,804,580 B1 * | 10/2004 | Stoddard et al. | 700/248 |
| 7,024,250 B2 * | 4/2006 | Graf et al. | 700/19 |

(Continued)

*Primary Examiner* — Khoi Tran
*Assistant Examiner* — Jaime Figueroa
(74) *Attorney, Agent, or Firm* — Venable LLP; Eric J. Franklin

(57) ABSTRACT

A control system for a plurality of mechanical units, namely robots and/or external axes. A manually-operated control, such as a joy-stick or key panel, is adapted to move at least one of the mechanical units or part thereof. The control system includes an indicator adapted to indicate whether the at least one mechanical unit or part thereof that is to be moved is associated with any other mechanical unit(s) or part(s) thereof and consequently indicate that movement of the at least one mechanical unit or part thereof will also result in the movement of the indicated associated mechanical unit(s) or part(s) thereof.

26 Claims, 2 Drawing Sheets

U.S. PATENT DOCUMENTS 7,069,112 B2 * 6/2006 Graf .............................. 700/248
7,783,387 B2 * 8/2010 Calcagno ...................... 700/264

2002/0193909 A1 12/2002 Parker et al.

* cited by examiner

CONTROL SYSTEM, METHOD AND COMPUTER PROGRAM

CROSS-REFERENCE TO RELATED APPLICATIONS

This application claims priority to Swedish patent application 0303384-2 filed 15 Dec. 2003 and is the national phase under 35 U.S.C. §371 of PCT/SE2004/001830.

TECHNICAL FIELD OF THE INVENTION AND PRIOR ART

The present invention concerns a control system for a plurality of mechanical units, namely robots and/or external axes, such as workstations or transport tracks. The control system comprises manually-operated control means, such as a joy-stick or key panel, adapted to move at least one of said mechanical units or part thereof. The invention also relates to a method for moving at least one of a plurality of mechanical units using manually-operated control means and a computer program containing computer program code means for making a computer or processor carry out such a method.

Many industrial plants utilize a plurality of mechanical units such as a multiple robot system or a system comprising a robot that cooperates with one or more external axes. The mechanical units are usually programmed to carry out a plurality of tasks. These tasks often require two or more of the mechanical units to move synchronously whereby the movement instructions in separate mechanical unit programs are executed at the same time in order to coordinate the movements of the mechanical units.

When running such multiple mechanical unit programs it is however sometimes necessary to interrupt the programs and move, or jog, one mechanical unit independently of the other mechanical units in order to perform maintenance or repair work, for example when the nozzle of a spray or welding gun held by a mechanical unit needs to be cleaned or replaced.

If the mechanical unit that is to be moved is associated with one or more of the mechanical units or part(s) thereof in the system due to the fact that it was carrying out a coordinated or synchronized task with one or more of the other mechanical units or part(s) thereof when the program was interrupted then movement of that mechanical unit will also consequently result in the movement of any mechanical units or part(s) thereof associated with the mechanical unit to be moved.

When a program is interrupted it is however difficult for an operator to foresee how a system comprising a plurality of mechanical units will respond to the execution of a specific command, such as joystick deflection, intended for one of the mechanical units. Such information is usually hidden in text and is hard for an untrained or inexperienced operator to find and understand.

An operator therefore runs the risk of personal injury to himself/herself or another person in the vicinity of the mechanical units and of damaging the mechanical units and other objects in the workspace of the mechanical units. Furthermore, there is also a risk that operating personnel may accidentally touch the manually-operated controls and move the mechanical units unintentionally, which could also result in injury or damage.

SUMMARY OF THE INVENTION

The object of the present invention is to provide a control system for a plurality of mechanical units that simplifies the task of moving, or jogging, at least one of said mechanical units or part thereof and which allows a movement command to be executed quickly and safely.

This object is fulfilled using a control system comprising manually-operated control means, such as a control lever, joy-stick or key panel, adapted to move at least one of said mechanical units or part thereof, which comprises indication means to indicate whether said at least one mechanical unit, or part thereof, that is to be moved is associated with any other mechanical unit(s) or part(s) thereof. By "associated" it is meant that the movement of a mechanical unit or part thereof will result in the movement of at least one other mechanical unit or part thereof as they are involved in a synchronous task. The control system consequently indicates that movement of said at least one mechanical unit or part thereof will also result in the movement of the indicated associated mechanical unit(s) or part(s) thereof. An operator will therefore immediately be made aware of which mechanical units or parts thereof will be affected by a specific command.

The expression "to move at least one mechanical unit or part thereof" in the claims is intended to mean not only displacement of whole or part of a mechanical unit, a part being a robot arm for example, but also includes changing the orientation of whole or part of a mechanical unit.

According to a preferred embodiment of the invention the indication means provides at least one of the following signals or a combination thereof: visual, acoustic, tactile, such as the vibration of a component of the control system. The system therefore has the function of a safety or warning system.

According to another preferred embodiment of the invention the indication means comprises a graphical and/or text interface, such as a touch screen, liquid crystal display, a computer's visual display unit or webpage, that displays which mechanical units or parts thereof are associated with one another by means of graphical symbols and/or text messages representing the plurality of mechanical units and/or parts thereof. The interface displays, by means of computer graphics for example, which mechanical units, or parts thereof, are associated with one another and thus which mechanical units or mechanical unit parts will be move on deflection of a joystick for example. According to a preferred embodiment of the invention such a visual display of information is accompanied by the sounding of an alarm that indicates that movement of a mechanical unit or part thereof will result in the movement of an associated mechanical unit or part thereof. Such an alarm is sounded as soon as an operator attempts to move the manually-operated control means or at the same time the visual information is displayed.

According to a preferred embodiment of the invention indication means, such as light emitting means, are arranged on each of the mechanical units or parts thereof to show which mechanical units or parts thereof are associated with one another, either constantly or when such information is requested.

According to a further preferred embodiment of the invention the graphical and/or text interface is arranged to provide information on how the, or each, mechanical unit or part thereof associated with said at least one mechanical unit or part thereof that is to be moved will move on movement of said at least one mechanical unit or part thereof for example by means of computer graphics. This indicates how each mechanical unit or part thereof will move in response to an operator's commands. The operator will also be able to see whether there are any obstacles in the path of the, or each, mechanical unit or part thereof that will be moved.

According to a preferred embodiment the indication means is mounted on a stationary or a portable programming unit.

According to a yet further preferred embodiment of the invention the control system comprises means to confirm that an operator is aware of which mechanical unit(s) or part(s) thereof will move on activation of the manually-operated control means. According to another preferred embodiment of the invention the control system comprises means adapted to disengage the manually-operated control means, i.e. make it impossible to use the manually-operated control means, until the operator has confirmed that he/she is aware of which mechanical unit(s) or part(s) thereof will move on activation of the manually-operated control means thus ensuring that accidental or unintentional movement of a mechanical unit or part thereof does not occur. Such a control system is easy to use and may be used by operators not having extensive training or experience.

According to a preferred embodiment of the invention the control system comprises software means adapted to disassociate one or more of the mechanical units or parts thereof that are associated with the mechanical unit or part thereof that is to be moved from said at least one mechanical unit or part thereof that is to be moved.

According to another preferred embodiment of the invention the control system comprises software means adapted to associate one or more of the mechanical units or parts thereof to said at least one mechanical unit or part thereof that is to be moved so that the operator may move a plurality of mechanical units or parts thereof simultaneously. Such association means is also used when the mechanical unit(s) or part(s) thereof that has/have been moved is/are returned into their original position so that the interrupted coordinated task can be continued.

Such association/dissociation means allow an operator to select which mechanical units or mechanical unit parts he/she would like to move and deselect all other mechanical units or parts thereof.

According to another preferred embodiment of the invention the confirmation means, disassociation means or association means is initiated by one click of a computer mouse or by pressing a keyboard tangent or push button, or touching an icon on a touch screen.

According to a further preferred embodiment of the invention the manually-operated control means is portable, which allows an operator to move freely in the workspace of the plurality of mechanical units while the inventive control system ensures the personal safety. Alternatively according to other preferred embodiments of the invention the manually-operated control means is located in the vicinity of, or in visual contact with, the plurality of mechanical units or at a location remote to the plurality of mechanical units. Remote control may be necessary when the mechanical units are operating in a hygienic or hazardous environment for example.

The present invention also concerns a method for moving at least one of a plurality of mechanical units or part thereof, namely robots and/or external axes, using manually-operated control means. The method comprises the step of indicating which mechanical units or parts thereof are associated with one another and consequently indicates that movement of said at least one mechanical unit or part thereof will result in the movement of the indicated associated mechanical unit(s) or part(s) thereof.

According to a preferred embodiment of the invention the method further comprises the step of indicating how the, or each, mechanical unit or part thereof associated with said at least one mechanical unit or part thereof that is to be moved will move on movement of said at least one mechanical unit or part thereof.

According to another preferred embodiment of the invention the method further comprises the step of the operator having to confirm that he/she is aware of which mechanical units or mechanical unit parts are associated with said at least one mechanical unit or part thereof that is to be moved before the manually-operated control means are activated.

A method according to the present invention relies on using a control system according to the present invention which indicates information on which mechanical units or parts thereof will move and optionally even how those mechanical units or parts thereof will move on execution of the operator's command thus providing a user-friendly control system that facilitates quick and safe control of a system comprising a plurality of mechanical units.

The present invention also relates to a computer program containing computer program code means for making a computer or processor carry out the step of the inventive method and such a computer program stored by means of a computer-readable medium. According to a preferred embodiment of the invention the computer program comprises means to prompt an operator to do at least one of the following:
a) select a mechanical unit or part thereof that is to be moved;
b) associate or disassociate one or more other mechanical units or parts thereof with/from the mechanical unit or part thereof to be moved, and c) confirm the selection of mechanical units or parts thereof to be moved before the operator's command is executed.

The control system, method and computer program according to the present invention are intended for use in any system comprising a plurality of mechanical units that are programmed to carry out at least one task where at least two of said mechanical units or parts thereof move synchronously. Examples of such a system are a multiple robot system or a system comprising a single robot that moves synchronously with one or more external axis.

Further advantages as well as advantageous features of the invention appear from the following description.

The following description is not intended to limit the present invention to the embodiment disclosed. The embodiments disclosed merely exemplify the principles of the present invention.

DETAILED DESCRIPTION OF PREFERRED EMBODIMENTS OF THE INVENTION

Figure 1:
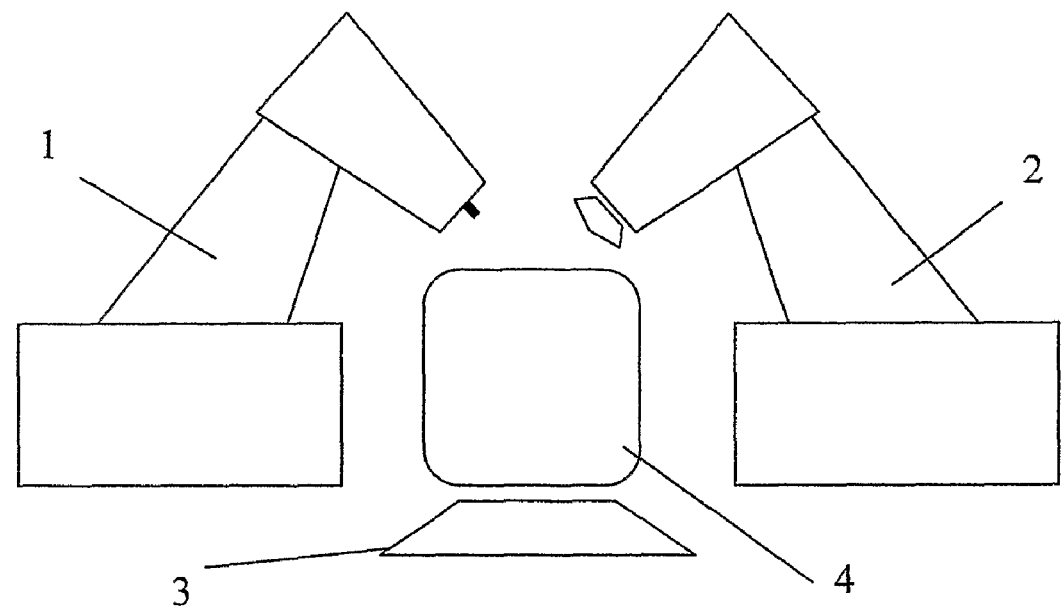
FIG. 1 shows a schematic diagram of a multiple-robot system and a graphic interface according to a preferred embodiment of the invention.
Figure 1:
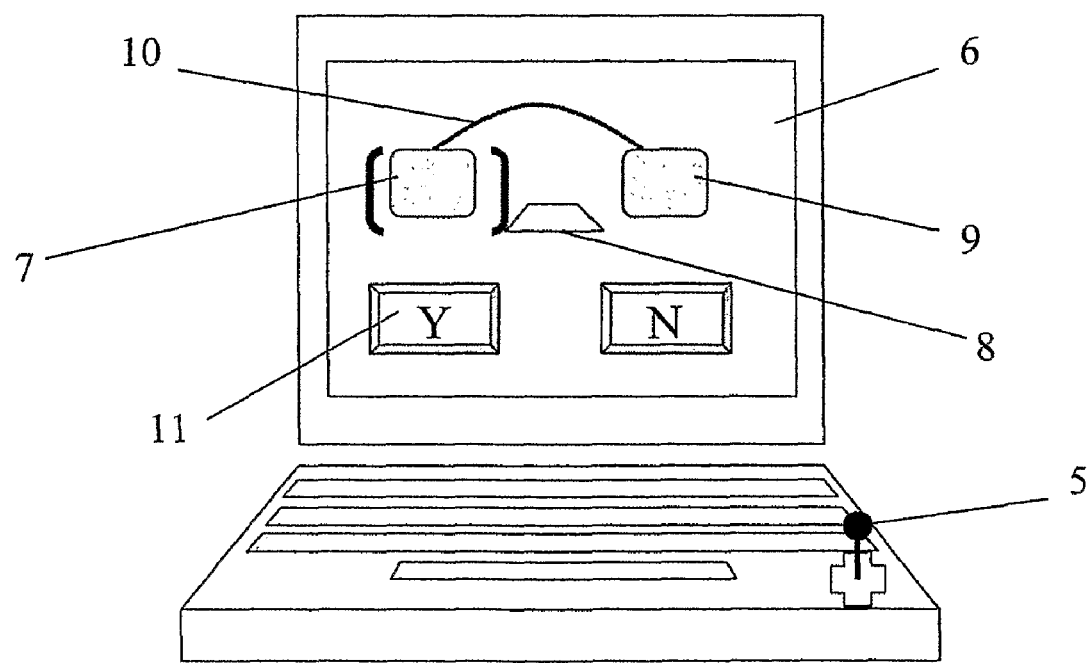

FIG. 1 shows a multi-robot system comprising two robots 1,2, and a rotatable workstation 3. Robot 1 is a welding robot and robot 2 carries a tool to carry out specified work on workpieces 4 carried by the workstation 3.

The robots 1,2 and the workstation 3 are programmed to carry out at least one task where the movements of at least two of the mechanical units are synchronized. When the welding robot, 1, has to be moved independently of the other robot 2 and the workstation 3, for maintenance work such as unblocking the nozzle of the welding gun held by the robot the program is interrupted. The operator uses a hand-operated control lever 5 mounted on a keyboard to move or jog the welding robot 1 independently of robot 2. The joystick is arranged so that rotation of the knob of the joystick results in rotation of a mechanical unit such as the workstation.

FIG. 1 shows part of a control system as seen by the operator which comprises a user interface 6 such as a screen on a TPU. displaying graphic symbols 7,8,9 representing Robot 1, the workstation 3 and Robot 2 respectively. Alternatively the user interface could be a computer's visual display unit, a touch screen or a liquid crystal display. The graphic symbols 7,8,9 inform the operator that Robot 1 has been selected for jogging and that due to the task that has just been performed, Robot 1 is associated with Robot 2. The graphic symbols are joined by a line 10 indicating that movement of Robot 1 will result in the movement of Robot 2. Any other way of displaying that a plurality of mechanical units are associated could be used such as coloured or flashing symbols.

The control system is arranged to ask the operator whether he/she wants to associate or disassociate any mechanical units with/from the Robot 1 and to await confirmation from the operator that his/her command is to be carried out before the command is executed. If Robot 2 is disassociated from Robot 1, Robot 1 can be moved independently to enable maintenance work to be carried out and then moved back into position and re-associated with Robot 2 so that the coordinated task may be continued.

The operator may confirm his selection of mechanical units to be moved by clicking once on a "yes" button 11 appearing on the user interface 6 as shown in FIG. 1. The safety precaution of incorporating a confirmation stage is advantageous in that it prevents unintentional/unexpected movement of the mechanical units 1,2,3 being executed immediately if the control lever 5 is moved accidentally. Risk of injury to people in the vicinity of the robot or damage to robots and objects in the workspace of the robots can therefore be eliminated.

According to a preferred embodiment of the invention the interface 6 is arranged to display a real time animated mimic display of the robot system and/or to provide information on how the robots will move in response to a specific command.

The control system is operated by an operator in the vicinity of the robots or remote to the robot system, who controls the system via a network such as the Internet for example.

Figure 2:
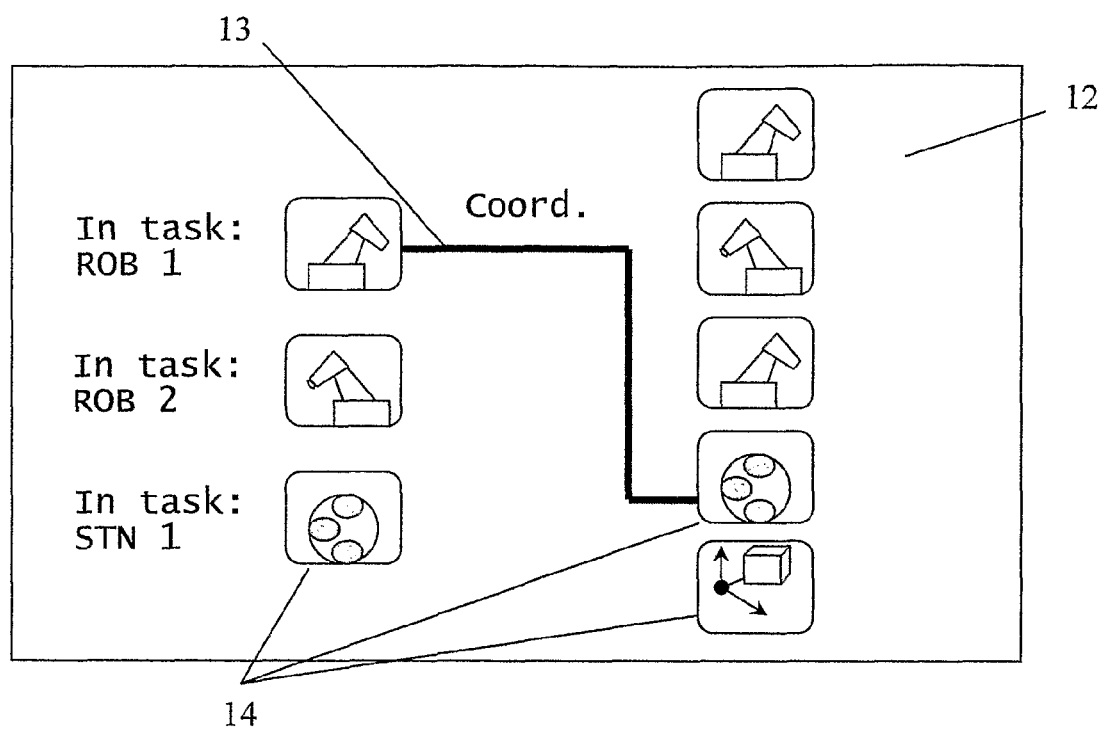
FIG. 2 shows a jog selection panel according to a preferred embodiment of the invention.

FIG. 2 shows a jog selection panel 12 according to a preferred embodiment of the invention. A line 13 interconnects graphical symbols 14 on a control unit touch screen depicting the different mechanical units of a multi-robot system which clearly displays which mechanical unit is selected for jogging and whether there are any other mechanical units associated with the same. In the example shown Robot 1 is associated with a workstation. The operator then selects which mechanical units he/she wishes to move on joystick deflection by touching the corresponding graphical symbols 14 to associate or disassociate one or more mechanical units with/from the mechanical unit to be moved. Such a jog selection panel could also be constituted of push buttons on a control panel interconnected by light emitting diodes for example. The jog selection panel could also comprise any other input and display device.

The invention is of course not in any way restricted to the preferred embodiments thereof described above, but many possibilities to modifications thereof would be apparent to a person with ordinary skill in the art without departing from the basic idea of the invention as defined in the appended claims.

The invention claimed is:

1. A control system for controlling the movements of a plurality of mechanical units, wherein at least two of the mechanical units have been programmed to perform a task, wherein the movements of the mechanical units are coordinated, the control system comprising:
    an automatic control configured to automatically control the movements of the mechanical units to perform the task in dependence on stored movement instructions for each of the mechanical units, and to execute the movement instructions for at least two of said mechanical units at a same time in order to coordinate the movements of the mechanical units;
    a manual control configured to manually control the movements of at least one of the mechanical units or a portion of the at least one of the mechanical units based on input from a manually-operated control member; and
    an indicator configured to indicate whether a mechanical unit, which has been selected to be manually moved based on input from the manually-operated control member, is associated with one of the other mechanical units as a result of the task, and consequently to indicate that movement of the selected mechanical unit will also result in movement of the associated mechanical unit.

2. The control system according to claim 1, wherein said indicator provides at least one of the following signals or a combination thereof: visual, acoustic, tactile.

3. The control system according to claim 1, wherein the indicator comprises at least one of a graphical or a text interface that displays which mechanical units, or parts thereof, are associated with one another with at least one of graphical symbols or text messages representing the plurality of mechanical units or parts thereof.

4. The control system according to claim 3, wherein the at least one of a graphical and/or or a text interface is arranged to indicate information on how the, or each, mechanical unit, or part thereof, associated with said at least one mechanical unit, or part thereof, that is to be moved will move on movement of said at least one mechanical unit or part thereof.

5. The control system according to claim 1, wherein an indicator is arranged on each of the mechanical units or part thereof to display which mechanical units are associated with one another, either constantly or when such information is requested.

6. The control system according to claim 1, wherein the indicator is mounted on a stationary or portable programming unit.

7. The control system according to claim 1, further comprising:
    a confirmation unit configured to confirm that an operator is aware of which mechanical unit(s) or part(s) thereof will move on activation of the manual control.

8. The control system according to claim 7, further comprising:
    a disengagement unit configured to disengage the manual control until the operator has confirmed that he/she is aware of which mechanical unit(s) or part(s) thereof will move on activation of the manual control.

9. The control system according to claim 1, further comprising:
    a disassociation unit configured to disassociate one or more of the mechanical units or parts thereof that are associated with the mechanical unit or part thereof that is to be moved from said at least one mechanical unit or part thereof that is to be moved.

10. The control system according to claim 1, further comprising:
    an association unit configured to associate one or more of the mechanical units or part thereof to said at least one mechanical unit or part thereof that is to be moved.

11. The control system according to claim 7, wherein the confirmation unit is initiated by one click of a computer mouse or by pressing a keyboard tangent or push button, or by touching an icon on a touch screen.

12. The control system according to claim 1, wherein the manual control is portable.

13. The control system according to claim 1, wherein the manual control is located in the vicinity of the plurality of mechanical units.

14. The control system according to claim 1, wherein the manual control is located at a location remote to the plurality of mechanical units.

15. A method for moving a plurality of mechanical units using a manual control, wherein at least two of the mechanical units have been programmed to perform a task, wherein movements of the mechanical units are coordinated, the method comprising:

automatically controlling movements of the mechanical units to perform the task in dependence on stored movement instructions for each of the mechanical units;

executing the movement instructions for at least two of said mechanical units at a same time in order to coordinate the movements of the mechanical units;

manually controlling the movements of at least one of the mechanical units or a portion of the at least one of the mechanical units based on input from a manually-operated control member; and indicating whether a mechanical unit, which has been selected to be manually moved based on input from the manually-operated control member, is associated with one of the other mechanical units as a result of the task, and consequently to indicate that movement of the selected mechanical unit will also result in movement of the associated mechanical unit.

16. The method according to claim 15, further comprising:

informing how the, or each, mechanical unit or part thereof associated with said at least one mechanical unit or part thereof that is to be moved will move on movement of said at least one mechanical unit or part thereof.

17. The method according to claim 15, further comprising:

an operator having to confirm that he/she is aware of which mechanical units or parts thereof are associated with said at least one mechanical unit or part thereof that is to be moved before the manually-operated control member is activated.

18. The method according to claim 17, wherein said confirmation is initiated by one click of a computer mouse or by pressing a keyboard tangent or push button, or touching an icon on a touch screen.

19. A computer program product, comprising:

a non-transitory computer readable medium; and computer program code recorded on the computer readable medium for making a computer or processor carry out a method comprising automatically controlling movements of the mechanical units to perform a task in dependence on stored movement instructions for each of the mechanical units;

executing the movement instructions for at least two of said mechanical units at a same time in order to coordinate the movements of the mechanical units;

manually controlling the movements of at least one of the mechanical units or a portion of the at least one of the mechanical units based on input from a manually-operated control member; and indicating whether a mechanical unit, which has been selected to be manually moved based on input from the manually-operated control member, is associated with one of the other mechanical units as a result of the task, and consequently to indicate that movement of the selected mechanical unit will also result in movement of the associated mechanical unit.

20. The computer program product according to claim 19, wherein the computer program code makes the computer or processor carry out the method further comprising prompting an operator to do at least one of the following: select a mechanical unit or part thereof that is to be moved, associate or disassociate one or more other mechanical unit or part thereof with/from the mechanical unit or part thereof to be moved; and confirming the selection of mechanical units or parts thereof to be moved before the operator's command is executed.

21. The control system according to claim 9, wherein the disassociation unit is initiated by one click of a computer mouse or by pressing a keyboard tangent or push button, or by touching an icon on a touch screen.

22. The control system according to claim 10, wherein the association unit is initiated by one click of a computer mouse or by pressing a keyboard tangent or push button, or by touching an icon on a touch screen.

23. The control system according to claim 1, wherein the mechanical units comprise robots and external axes.

24. The control system according to claim 1, wherein the manually-operated control member comprises a joy-stick or key panel.

25. The method according to claim 15, wherein the mechanical units comprise at least one of robots or external axes.

26. The method according to claim 15, wherein the manually-operated control member comprises a joy-stick or key panel.

* * * * *